United States Patent [19]
Hostetler

[11] 3,869,006
[45] Mar. 4, 1975

[54] WEIGHT CONTROLLED FEEDER SYSTEM

[75] Inventor: Eldon Hostetler, Middlebury, Ind.

[73] Assignee: Chore-Time Equipment, Inc., Milford, Ind.

[22] Filed: Aug. 25, 1972

[21] Appl. No.: 283,724

[52] U.S. Cl. .............................................. 177/60
[51] Int. Cl. ........................................... G01g 13/02
[58] Field of Search ................. 177/60, 114; 222/76

[56] References Cited
UNITED STATES PATENTS

| | | | |
|---|---|---|---|
| 2,050,314 | 8/1936 | Grunewald | 177/60 X |
| 3,370,662 | 2/1968 | Eisner | 177/60 |
| 3,430,721 | 3/1969 | Harmon et al. | 177/60 X |

*Primary Examiner*—Stanley H. Tollberg
*Attorney, Agent, or Firm*—Olson, Trexler, Wolters, Bushnell & Fosse

[57] ABSTRACT

Feed dispensing apparatus for delivering weighed amounts of feed to poultry and the like is disclosed, and an associated method of feed delivery is described. At a predesignated time, a time switch starts a filling operation by actuating a first conveyor, which transports feed from a bulk storage bin to a receiving hopper. A weighing device connected to the hopper weighs the feed being delivered, and when a predetermined weight of feed has been received in the hopper, the weighing device actuates an automatic valve to halt further feed delivery to the hopper. If a plurality of hoppers are used, the hoppers are filled in seriatim order, and filling the last hopper halts operation of the first conveyor. A switch is provided to insure that refilling of the hoppers does not occur until a second predetermined time is reached. After the hoppers are filled, the time switch starts a feeding operation by actuating a second conveyor to deliver feed from the weighing hopper or hoppers to poultry feeding stations. High feed level sensors are provided to halt operation of the second conveyor if a maximum level of feed is exceeded in the feeding stations. When the flock consumes feed to a level below the high feed level sensors, the second conveyor is reactuated, and more feed is delivered to the poultry feeding stations. A hopper low feed level sensor halts further operation of the second conveyor when a minimum level of feed is reached in the hopper. At the second predetermined time, the first conveyor is again actuated, and the filling and feeding cycle is repeated.

3 Claims, 6 Drawing Figures

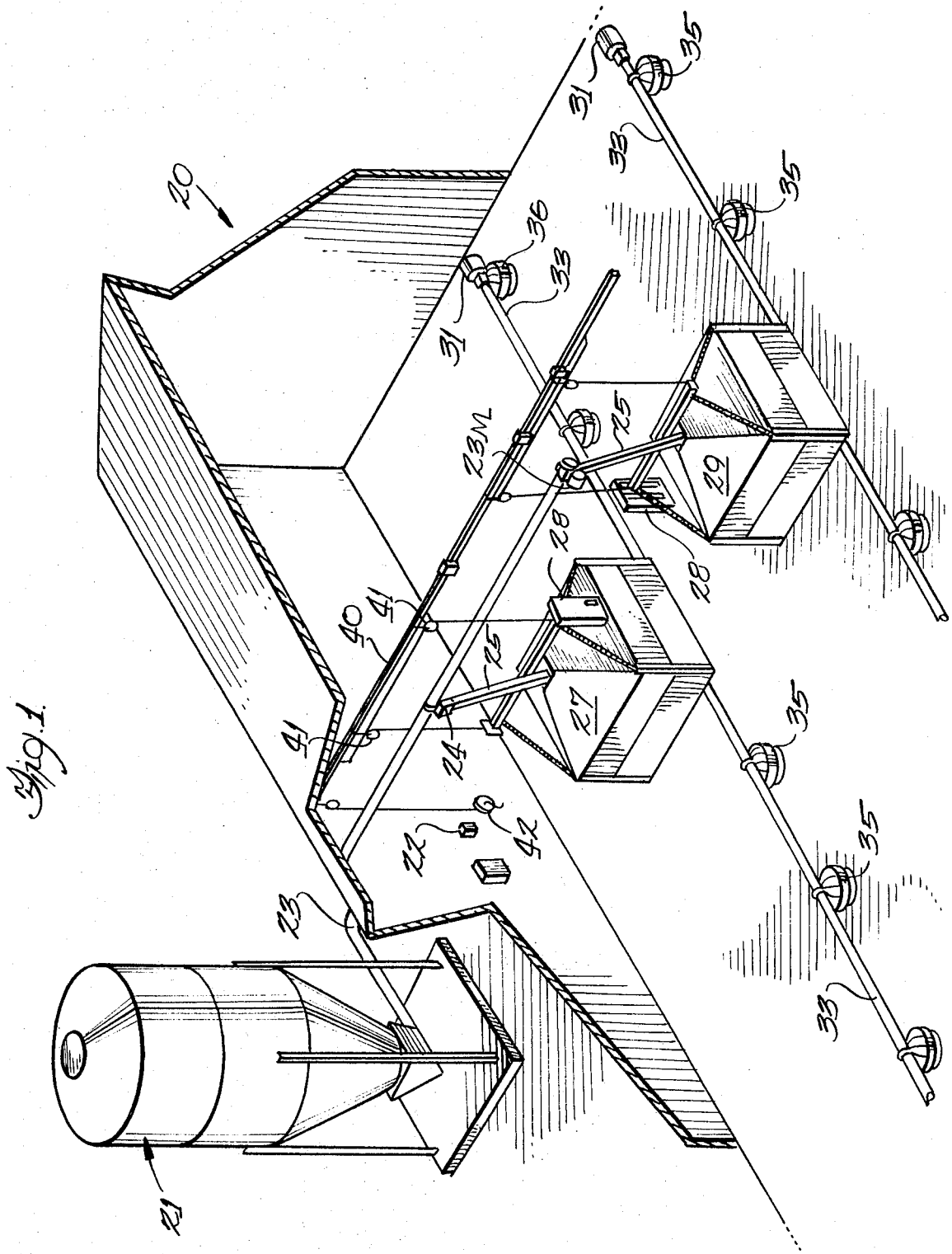

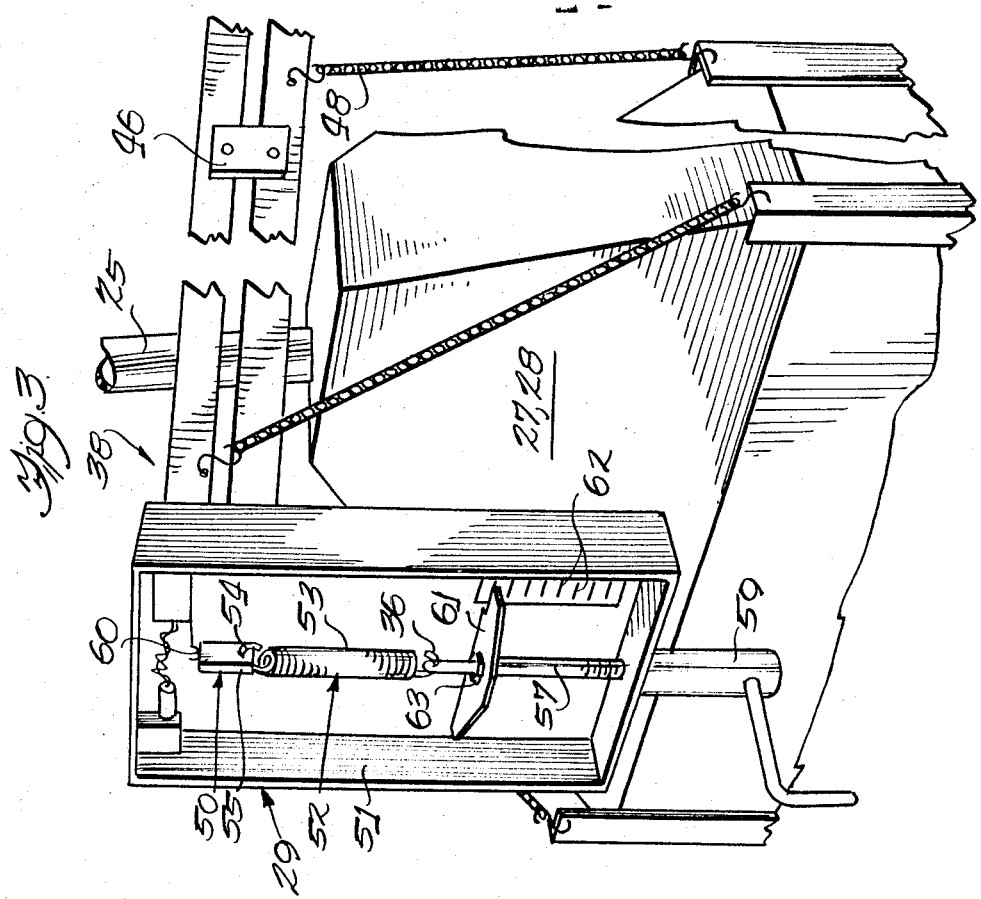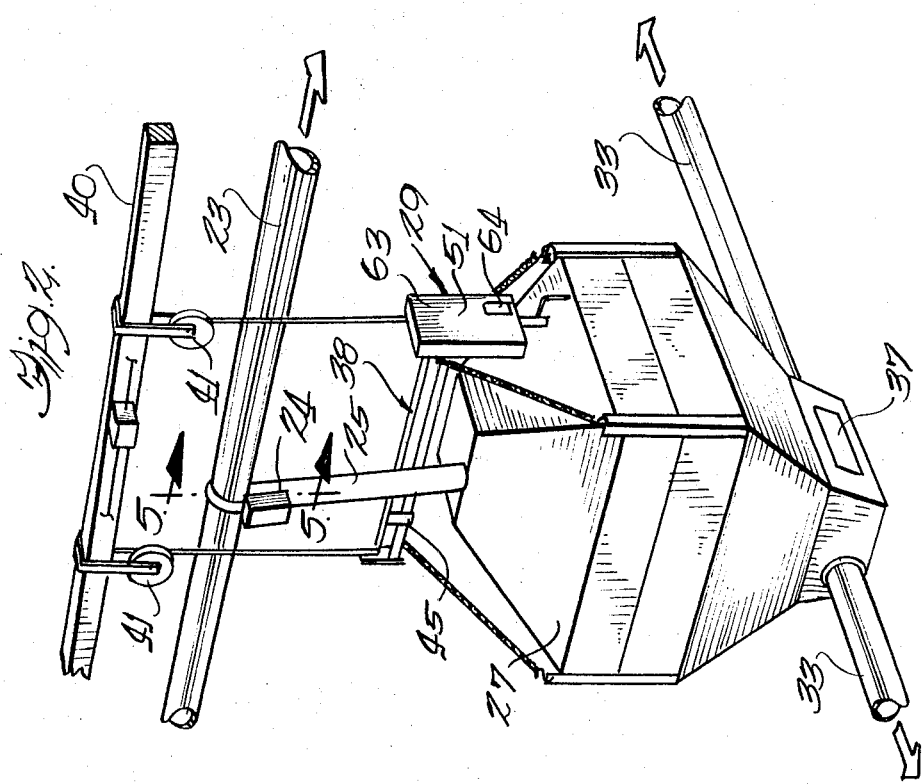

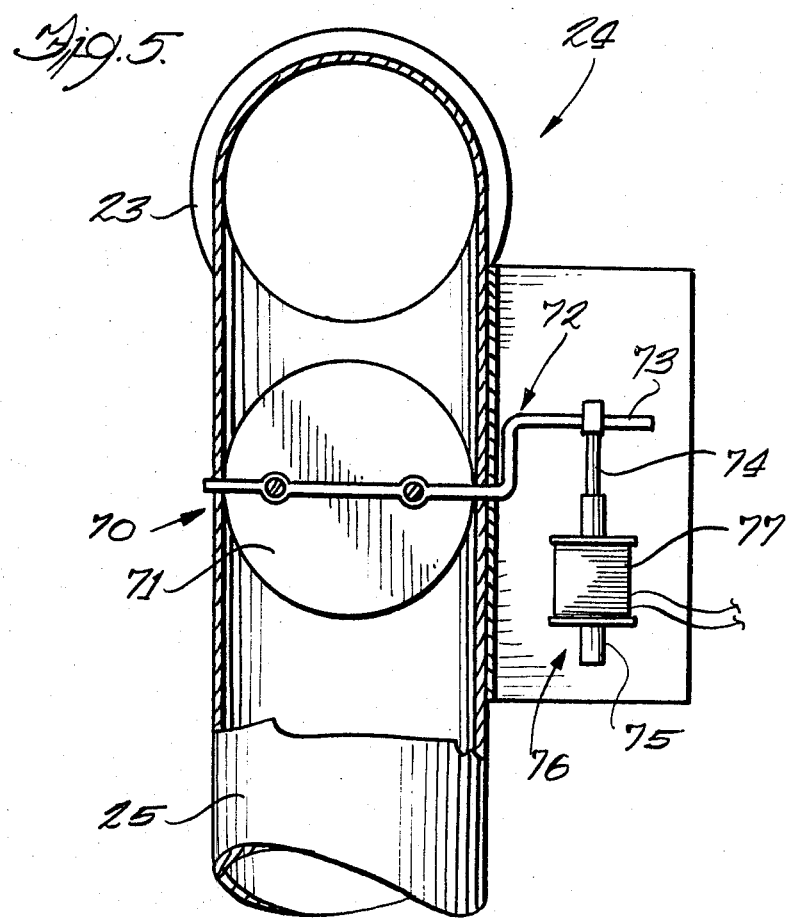

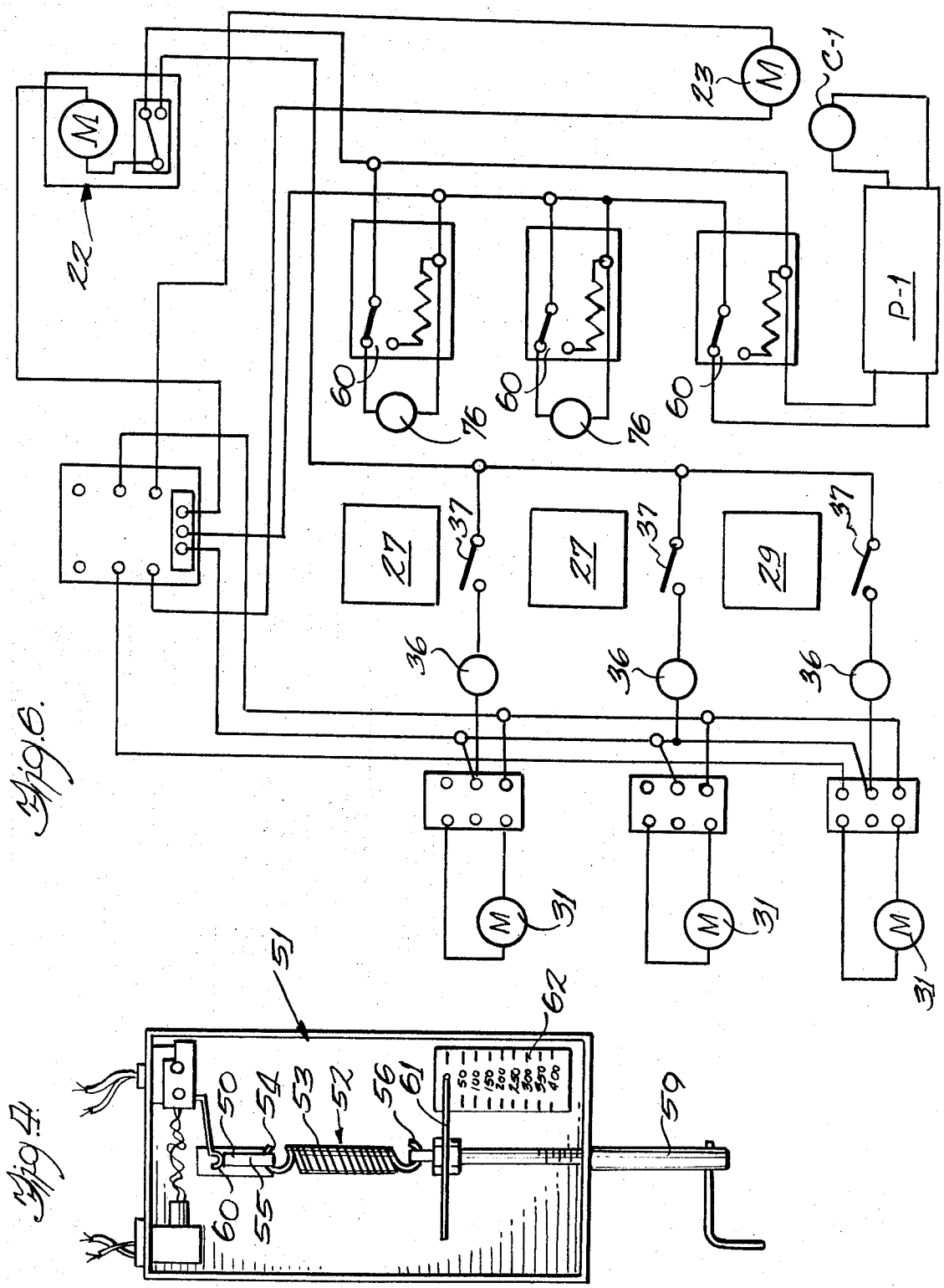

WEIGHT CONTROLLED FEEDER SYSTEM

DESCRIPTION OF THE INVENTION

This invention relates generally to feeding systems for poultry and the like, and more particularly concerns a feeding system wherein a predetermined weight of feed is delivered to the poultry.

Modern poultry operations involve raising large flocks of breeding, laying or broiling hens to a uniformly high level of performance. To obtain this desired high performance, closely controlled feeding programs are necessary.

More specifically, experimentation has shown that when the amount of feed provided to a flock is closely controlled, laying hens convert maximum amounts of feed into end egg product, broiler flocks grow quickly to uniformly maximum size, and commercial breeding hens lay relatively large numbers of full size, hatchable eggs. Experimentation has also shown that close control of feed amounts is especially important during the growing and early laying periods of the fowls' life cycle. As breeding and commercial laying hen flocks mature, savings can be obtained by carefully decreasing the level of feed delivered to the hens in proportion to their decreasing egg production.

Several feeding equipment systems have been offered to provide feed to flocks in the necessary closely measured amounts. One such system which has met with considerable commercial success is described in Ramser U.S. Pat. No. 3,598,087, wherein a predetermined volume of feed is measured out and delivered to the flock. While this system provides numerous advantages over previous systems, operation of volume-measuring feed systems requires careful management to compensate for volumetric variations in feed density if the flock is to be fed with great precision. These variations in feed density are attributable to variations in types and mixes of feed, changes in environmental temperature, humidity, and other causes.

Known feeding systems can be used to provide precisely weighed amounts of feed to the flock. The flock is thus fed with great precision, but this type of system has required manual weighing of the feed on dump scales.

Experience has also shown that flock performance can be enhanced by providing the measured amounts of feed to the flock at carefully timed intervals. When the flock is fed on a carefully timed schedule, the birds tend to mature at a uniform rate, and hens in breeding or laying flocks begin egg production at nearly the same time. This uniformity of performance eases flock tending operations.

It is therefore a principle object of this invention to provide an automated, controlled feeding system wherein the amount of feed to be delivered to the flock is precisely measured out by weight and is delivered on a precisely timed schedule.

More specifically, it is an object of the invention to provide a controlled feeding system wherein feed is delivered from a bulk storage bin to receiving hoppers only until a precisely predetermined weight of feed has been received in the hopper. Further delivery of feed to the receiving hopper is then halted, and the accurately weighed amount of feed is delivered rapidly and uniformly to the consuming flock on a precisely timed schedule.

It is another object of the invention to provide a weight-controlled feeding system wherein the weight of feed to be provided to the flock can be easily adjusted to accommodate maturation or other changes in the flock.

It is yet another object to provide the described weight-controlled feeding system with a programmable timing device having an operating cycle of extended duration, thereby permitting the flock to be fed on an every-other-day basis to further develop flock performance. It is a related object to provide the described system with a programmable timing device wherein the feeding program can be easily and quickly altered to accommodate maturation or other changes in the flock.

It is a further object of the invention to provide a weight-controlled feeding system which can be easily and quickly installed by even relatively inexperienced personnel.

Other objects and advantages of the invention will become apparent upon reading the following detailed description and upon reference to the drawings, in which FIG. 1 is a perspective view showing the novel feeding system in its general aspect as it appears when installed in a typical poultry house;

FIG. 2 is a perspective view showing in further detail a typical slaved feed-receiving hopper, the associated feed weighing means and related structure;

FIG. 3 is a fragmentary perspective view showing in further detail the feed weighing mechanism and associated structure;

FIG. 4 is an elevational view showing in further detail the weighing switch and associated parts;

FIG. 5 is a sectional view taken substantially in the plane of line 5-5 in FIG. 2 showing in further detail the feed-directing valve device used to terminate feed flow to a filled receiving hopper; and FIG. 6 is a schematic diagram of a wiring arrangement which can be used to operate the invention.

While the invention will be described in connection with a preferred embodiment and procedure, it will be understood that it is not intended to limit the invention to that embodiment or procedure. On the contrary, it is intended to cover all alternatives, modifications, and equivalents as may be included within the spirit and scope of the invention. Throughout the description of the illustrated embodiment, like reference numerals refer to like parts in all the figures.

Turning first to FIG. 1, there is shown the novel feed dispensing apparatus in its general or overall aspect, as it appears when installed in a typical poultry house 20. Relatively large amounts of feed may be stored in a bulk feed storage means 21, which may be located in any convenient position relative to the poultry house 20. In the illustrated embodiment, the bulk feed storage tank 21 is shown located outside the poultry house 20 to provide maximum room within the house, and to allow delivery of large amounts of feed to the system without disturbing the flock.

At a preselected time, a time clock switch 22 actuates a first conveyor 23 to deliver feed from the bulk feed storage tank 21 in accordance with one aspect of the invention. The time clock 22 has a 48-hour cycle to permit extended programming and a feeding schedule permitting feed delivery on an every-other-day basis to permit development of the fowl's feed consumption capacity. The switch contacts may be of the two position variety allowing the time switch to be selectively programmed to alternatively emit, terminate or otherwise alter the emission of a signal to associated motors and other equipment. A time switch of this type is commercially available from Tork Time Controls, Inc., 100 Grove St., Mount Vernon, N.Y. 10551.

In the illustrated embodiment, the first conveyor 23, actuated by the time clock 22, takes the form of a flexible auger device of a type similar to that shown in Ramser U.S. Pat. No. 3,598,087. The delivered feed first passes from the first conveyor 23 through an automatic shut off valve 24, down an associated drop tube 25, and into a novel slave weighing hopper 27. In accordance with the invention, a weighing device 28 senses the weight of feed accumulating in the hopper 27, and closes the associated automatic valve 24 when a predetermined amount of feed has been accumulated within the hopper 27. Feed in the conveyor 23 then bypasses the isolated hopper 27, and is delivered to a master hopper 29. When the master hopper 29 has been appropriately filled with feed, operation of the first feed conveyor 23 is automatically halted by the weighing device 28 associated with the master hopper 29. Further operation of the first feed conveyor 23 is blocked by a relay 30 until another hopper-filling cycle is required by the time switch device 22.

At a later predesignated time, in further accordance with the invention, the time switch device 22 energizes appropriate motors 31 to drive second conveyors 33 associated with each of the hoppers 27, 29. These second conveyors 33 deliver feed from the hoppers 27, 29 to a number of poultry feeding stations 35. Feed can be delivered rapidly to a large number of feeding stations 35 if the hoppers 27, 29 are located relatively centrally of the poultry house 20 and two conveyors 33 are provided for each hopper 27 or 29 to transport the feed in opposite directions away from the hopper.

In accordance with another feature of the invention, overfilling of the feeding stations 35 and consequent loss due to spillage is avoided by a sensor 36 disposed to sense the level of feed contained in the feeding station 35. A switch device (not shown) is wired to the associated second conveyor 33 to halt delivery of feed to the feeding station 35 when a predetermined maximum feed level is reached. A sensor 36 suitable for the described operation is more fully described in Myers U.S. Pat. No. 3,415,228.

When the level of feed in the feeding stations 35 is consumed by the flock to a level below the predetermined cutoff point, the sensor 36 permits the second conveyor 33 to be reactuated. Feed is thus delivered from the hopper 27 or 29 to the associated station 35, until the level of feed in the hopper drops below another predetermined level. Thus, in accordance with another aspect of the invention, a low level cut-out switch 37 (see FIG. 2) operates to halt further operation of the second conveyor 33 until the first conveyor 23 has been operated to refill the hopper 27 or 29. This low level cut-out switch 37 is more fully described in Ramser U.S. Pat. No. 3,598,087.

Attention is now directed more specifically to the novel hopper weighing device illustrated in FIGS. 2–4. As illustrated therein, the weighing device 28 includes a balance beam device 38 appropriately suspended from convenient superstructure 40. Preferably, the carried hoppers 27 and 29 and associated weighing device 38 are supported by a system of pulleys 41 and a winch 42 (see FIG. 1) to permit the hoppers 27 and 29 and weighing device 28 to be lowered from their normal operating positions for cleaning and servicing.

To accurately measure the weight of feed delivered to the associated hoppers 27 and 29 in accordance with this invention, the balance beam mechanism 38 includes a balance beam 45 suspended for pivoting motion about a balance point 46; the hopper 27 or 29 is, in turn, at least partly suspended from the balance beam 45, as by convenient cables 48. The addition of feed to the hoppers 27 or 29 through the associated drop pipe 25 increases the weight suspended from the balance beam 45, and causes rotation of the balance beam 45 into a corresponding position. A balance beam position sensor in the form of an electrical contact switch 50 is provided in a housing 51 to actuate other parts of the feeding system when a predetermined weight of feed has been deposited in the suspended hopper 27 or 29.

The weight of feed required to actuate the switch 50 can be adjusted by the switch adjustment means 52, here comprising a counter-balance spring 53 attached at one end 54 to an extension 55 of the balance beam 45, and at its other end 56 to an adjustment rod 57 which is, in turn, connected to the balance beam switch housing 51. Preload tension is applied to the counter-balance spring 53 by a crank device 59 threaded to the adjustment rod 57. Rotation of the crank 59 applies tension to the spring 53 and draws the balance beam 45 into a relatively unloaded position. As feed is added to the hopper and the weight of the suspended hopper increases, the balance beam is pivoted, thereby raising the balance beam extension 55 in the illustrated construction until contact is made with the prepositioned electrical contact 60, and a circuit is closed. Closure of this circuit energizes a coil in the relay 30, thereby opening the relay contacts, and breaking the circuit to the associated automatic valve 24 or first conveyor motor 23M. Thus, in accordance with another aspect of the invention, the control circuit for the hopper associated with each weighing device 28 is thereby locked open, and no more feed can be delivered to the hopper until the next hopper-filling cycle is started by the time clock 22. Accidental reactivation of the hopper-filling conveyor 23 or automatic valves 24 is prohibited; such accidental reactivation might otherwise be caused by birds bumping into the hoppers 27, 29 or weighing device 28, or by other factors.

The balance beam 45 and associated switch 50 may be mutually positioned to either open or close the switch 50 when the predesignated weight is sensed in the associated hopper, and the beam 45 pivots into its corresponding position. It is within the purview of this invention that appropriate circuitry can be provided to accommodate either opening or closing action of the switch 50 and to appropriately actuate other parts of the invention when the associated balance beam 45 is pivoted by the weight of feed and hopper.

A pointer 61 is provided on the pin adjustment rod 57 for indicating upon a scale 62 the weight of feed required to actuate the balance beam switch 50. By periodically increasing the amount of feed required to actuate the switch 50, a gradually increasing amount of feed can be delivered to the flock, thereby providing for growth and maturity of the flock. To prevent dirt and other foreign objects from interfering with operation of the balance beam members, the switch housing 51 may be provided with a cover 63 having a window 64, through which the pointer 61 and associated scale 62 may be observed, as shown in FIG. 2.

In further accordance with the invention, when a sufficient weight of feed has been delivered to the hoppers 27, 29 to actuate the balance beam means, delivery of further feed to the hoppers 27, 29 is halted by the novel automatic valve 24 and by appropriate circuitry elsewhere described connecting the valve 24 to the balance beam switch 50. As may be envisioned from FIG. 5, the first conveyor 23 provides feed to each of the drop tubes 25 associated with the respective slave hoppers 27. Located within the top of the drop tube 25 is a valve 70 which, in the illustrated embodiment, takes the form of a butterfly valve plate 71 suspended for pivoting motion between an open and a closed position by a crank pin 72. To pivot the plate 71, the crank throw 73 is connected, by means of a connecting rod 74, to the core member 75 of a solenoid 76 having a vertically mounted surrounding coil member 77. Energization of the coil 77 draws the core member 75 into the coil in a known manner, thereby causing rotation of the crank 72 and rotation of the butterfly valve plate 71 into its open position. Feed is thereby directed down the associated drop tube 25 to the hopper 27.

In carrying out the invention, the solenoid coil 77, core 75, crank 72, and butterfly valve plate 71 are so arranged that when power is intentionally or inadvertently switched off from the coil 77, the core member 75 will simply drop partially away from the coil member 77, thereby causing rotation of the butterfly valve plate 71 into a closed position which halts delivery of feed to the associated hopper. As with the balance beam switch 50, it is within the purview of the broad aspects of the invention that the valve parts can be arranged so that a positive application of power to the coil 77 will rotate the valve plate 71 into a closed position, if such arrangement is desired.

With the foregoing description in mind, operation of the system can be easily envisioned by reference to the electrical wiring diagram shown in FIG. 6. At a preselected time, the 48-hour time switch 22 energizes the drive motor 23M of the first conveyor 23. Feed is then delivered by the first conveyor 23 to the first of the slave weighing hoppers 27. When the first hopper is filled and the weighing device switch 50 opens, the automatic valve solenoid 76 is de-energized as described above, thereby closing the automatic valve 70 and causing the feed flow to bypass the now-filled hopper 27. All the hoppers are thus filled in seriatim order, until the last master hopper 29 is filled to the preset weight required. Deactivation of the weighing device switch 50 associated with the master hopper 29 causes an associated power unit P-1 to de-energize the coil C-1 of the first conveyor drive motor 23M, thereby halting further operation of the first conveyor drive.

After the hoppers 27 and 29 have been filled, the time clock switch 22 initiates the feed cycle by energizing the second conveyor motors 31 through the hopper feed level switches 37. As described above, both the feeding station high-level cut out switches 36 and the hopper low level cut out switches 37 must be closed for the conveyor system motors 31 to operate. Should the respective feeding stations become completely filled with feed, the high-level cut out switches 36 will open, thereby halting the respective conveyor motor 31, and preventing over-filling the feeding stations with consequent loss of feed. As soon as the fowl have eaten a sufficient quantity of feed to lower the level of the feed in the feeding station 35 below the predetermined point, the high-level cut out switches 36 will again close, permitting re-energization of the respective second conveyor motor 31, and delivery of an additional quantity of feed to the feeding station. When the feed has been substantially emptied from the associated hopper 27 or 28, the hopper low-level cut out switch 37 is opened, as described above, and further operation of the conveyor is halted. As soon as the next selected time for actuation of the feed cycle is reached, the time switch 22 energizes the first conveyor motor 23M, and the cycle is repeated.

The invention claimed is as follows:

1. Feed weighing means for use with a feed dispensing apparatus including feed-receiving hopper means adapted to receive a flow of feed, hopper support means directly supporting the hopper means at a first location to prevent significant hopper movement when feed weight is added to the hopper, weight indicator means, means extending directly from a second location on the hopper means to the weight indicator means and connecting the feed receiving hopper means second location and the weight indicator means for moving the weight indicator means through a limited range of positions in response to the weight of feed received in the hopper means and transferred to the weight indicator means, and weighing switch means actuatable by the weight indicator means when a predetermined weight of feed has been received in the hopper means and the weight indicator means has been disposed in a predetermined corresponding position.

2. Feed weighing means for use with a feed dispensing apparatus including feed-receiving hopper means, hopper support means attached to the hopper means for supporting the hopper against significant movement as feed is received in or dispensed from the hopper, balance beam means movable through a limited range of positions in response to a predetermined weight applied thereto, interconnector means connected to the hopper at a location spaced apart from the support means attachment point and further connected to the balance beam means for applying only a part of the weight of the hopper means and feed received in the hopper means to the balance beam means and for moving the balance beam means through its corresponding range of positions in response to the applied weight, and weighing switch means actuatable by the balance beam means when a predetermined weight of feed has been received in the hopper means and the balance beam means has been moved into a corresponding predetermined position within said limited range of positions.

3. Feed weighing means according to claim 2 wherein said weighing switch means includes a mechanical bi-position trip switch mounted relative to said balance beam means to be moved between two positions as the balance beam means moves into and out of said predetermined position within said range of positions.

* * * * *